United States Patent
Reuter et al.

(10) Patent No.: US 10,017,025 B2
(45) Date of Patent: Jul. 10, 2018

(54) VEHICLE SUSPENSION CONTROL SYSTEM WITH HIGH FLOW EXHAUST MECHANIZATION

(71) Applicant: BeijingWest Industries, Co. Ltd., Beijing (CN)

(72) Inventors: David Fredrick Reuter, Beavercreek, OH (US); Daniel Norbert Borgemenke, Springboro, OH (US); Bryan P. Riddiford, Dayton, OH (US); Michael William Landis, Bellbrook, OH (US)

(73) Assignee: BeijingWest Industries Co., Inc., Beijing (CN)

( * ) Notice: Subject to any disclaimer, the term of this patent is extended or adjusted under 35 U.S.C. 154(b) by 0 days.

(21) Appl. No.: 15/425,022

(22) Filed: Feb. 6, 2017

(65) Prior Publication Data

US 2017/0267046 A1    Sep. 21, 2017

Related U.S. Application Data

(60) Provisional application No. 62/310,544, filed on Mar. 18, 2016.

(51) Int. Cl.
*B60G 17/018* (2006.01)
*B60G 11/27* (2006.01)
(Continued)

(52) U.S. Cl.
CPC ............ *B60G 17/018* (2013.01); *B60G 11/27* (2013.01); *B60G 11/30* (2013.01); *B60G 17/019* (2013.01);
(Continued)

(58) Field of Classification Search
CPC .. B60G 17/018; B60G 17/019; B60G 17/056; B60G 17/0528; B60G 11/27;
(Continued)

(56) References Cited

U.S. PATENT DOCUMENTS

| | | | |
|---|---|---|---|
| 5,220,505 A | 6/1993 | Yokote et al. | |
| 5,465,209 A | 11/1995 | Sammut et al. | |

(Continued)

FOREIGN PATENT DOCUMENTS

| | | | |
|---|---|---|---|
| JP | 5741465 U | 9/1983 | |
| JP | 61203921 U | 7/1988 | |

(Continued)

OTHER PUBLICATIONS

European Search Report dated Jul. 24, 2017, Eight (8) Pages.
First Office Action issued for corresponding Japanese Patent Application 2017-049460 dated Jan. 23, 2018, 6 pages.

*Primary Examiner* — Drew J Brown
(74) *Attorney, Agent, or Firm* — William H. Honaker; Dickinson Wright PLLC

(57) ABSTRACT

An air management system for a vehicle. The air management system includes at least one air spring. A compressor is provided for filling the air spring. A central air line is fluidly connected to the air spring and the compressor. At least one spring air line extends between the central air line and the air spring. At least one suspension valve is disposed along the spring air line. At least one auxiliary air line extends between the spring air line and the central air line. At least one high flow exhaust valve is disposed along the auxiliary air line. At least one isolation check valve is disposed in series with the high flow exhaust along the spring air line. The isolation check valve allows air to pass through therethrough from the air spring to the central air
(Continued)

line while preventing air from passing therethrough from the central air line to the air spring.

20 Claims, 10 Drawing Sheets

(51) Int. Cl.
*B60G 11/30* (2006.01)
*B60G 17/019* (2006.01)
*B60G 17/056* (2006.01)
*B60G 17/052* (2006.01)

(52) U.S. Cl.
CPC ....... *B60G 17/056* (2013.01); *B60G 17/0528* (2013.01); *B60G 2202/154* (2013.01); *B60G 2202/42* (2013.01); *B60G 2206/0116* (2013.01); *B60G 2400/51* (2013.01); *B60G 2400/60* (2013.01); *B60G 2500/203* (2013.01); *B60G 2500/2012* (2013.01); *B60G 2500/2014* (2013.01); *B60G 2500/2021* (2013.01); *B60G 2500/2042* (2013.01); *B60G 2500/2044* (2013.01); *B60G 2600/66* (2013.01); *B60G 2600/73* (2013.01); *B60G 2800/019* (2013.01); *B60G 2800/164* (2013.01); *B60G 2800/914* (2013.01)

(58) Field of Classification Search
CPC ............... B60G 11/30; B60G 2600/66; B60G 2500/2014; B60G 2500/2042; B60G 2500/2044; B60G 2600/73; B60G 2400/60; B60G 2800/914; B60G 2202/42; B60G 2500/2021; B60G 2500/203; B60G 2500/2012; B60G 2400/51; B60G 2206/0116; B60G 2202/154; B60G 2800/164; B60G 2800/019
See application file for complete search history.

(56) References Cited

U.S. PATENT DOCUMENTS

| | | | |
|---|---|---|---|
| 5,466,007 A * | 11/1995 | Smith | B60G 17/0155 280/124.102 |
| 6,173,974 B1 | 1/2001 | Raad et al. | |
| 6,332,623 B1 * | 12/2001 | Behmenburg | B60G 17/0155 267/64.11 |
| 6,752,402 B2 * | 6/2004 | Grotendorst | B60G 11/27 280/5.507 |
| 6,935,625 B2 | 8/2005 | Bolt et al. | |
| 7,441,789 B2 * | 10/2008 | Geiger | B60G 17/0155 280/124.157 |
| 7,497,452 B2 | 3/2009 | Schedgick | |
| 7,552,932 B2 * | 6/2009 | Matern | B60G 17/0155 280/124.16 |
| 7,942,427 B2 | 5/2011 | Lloyd | |
| 8,220,876 B2 | 7/2012 | Detlefs et al. | |
| 8,490,952 B1 | 7/2013 | Vogel et al. | |
| 8,517,396 B2 | 8/2013 | Brookes et al. | |
| 8,777,246 B2 * | 7/2014 | Meier | F17D 1/02 137/487.5 |
| 8,814,190 B2 * | 8/2014 | Becher | F04B 7/02 137/487.5 |
| 8,899,598 B2 * | 12/2014 | Frank | F16K 31/0651 137/565.18 |
| 8,905,071 B2 | 12/2014 | Coombs et al. | |
| 9,010,785 B2 * | 4/2015 | Gocz | B60G 17/0523 280/124.16 |
| 9,062,571 B2 * | 6/2015 | Frank | F01L 1/34 |
| 2006/0006733 A1 * | 1/2006 | Geiger | B60G 17/0157 303/3 |
| 2008/0111337 A1 * | 5/2008 | Suzuki | B60G 11/27 280/124.157 |
| 2013/0255240 A1 * | 10/2013 | Bergemann | B60G 17/0523 60/327 |
| 2013/0257007 A1 * | 10/2013 | Frank | B60G 17/0523 280/124.161 |
| 2013/0318954 A1 * | 12/2013 | Frank | B60G 17/0155 60/407 |
| 2014/0312590 A1 | 10/2014 | Stabenow | |
| 2015/0151602 A1 * | 6/2015 | Suzuki | B60G 17/017 280/6.157 |
| 2015/0151603 A1 * | 6/2015 | Kondo | B60G 17/017 280/6.157 |

FOREIGN PATENT DOCUMENTS

| | | |
|---|---|---|
| JP | 2015506298 A | 3/2015 |
| WO | 2013000014 A1 | 1/2013 |
| WO | 2013091776 A2 | 6/2013 |

* cited by examiner

VEHICLE SUSPENSION CONTROL SYSTEM WITH HIGH FLOW EXHAUST MECHANIZATION

CROSS REFERENCE TO RELATED APPLICATIONS

This application claims the benefit of U.S. Provisional Patent Application Ser. No. 62/310,544 filed on Mar. 18, 2016, and titled "VEHICLE SUSPENSION CONTROL SYSTEM WITH TRANS-AXLE HIGH FLOW EXHAUST MECHANIZATION", the entire disclosure of which is hereby incorporated by reference.

FIELD OF THE INVENTION

An air management system for controlling an air suspension assembly of an automotive vehicle. More specifically, an air suspension control system including high flow exhaust mechanization.

BACKGROUND OF THE INVENTION

Air suspension assemblies are known in the art for use on various vehicles, including automobiles. Air suspension assemblies typically include a plurality of air springs, each for interconnecting the body and one of the wheels of the automotive vehicle for damping relative forces between the body and the wheels, and for adjusting the height of the automotive vehicle. One example of such an air suspension assembly is disclosed in U.S. Pat. No. 5,465,209 to Sammut et al. The air suspension assembly includes a compressor for filling the air springs as well as a plurality of valves that are disposed between the compressor and the air springs and controlled by a controller for regulating air flow from the compressor to the air springs.

There are several known issues with current air suspension assemblies. Notably, they typically can only lower the vehicle at a single speed, and it can take a relatively long time for the vehicle to successfully lower. Additionally, current air management systems can be relatively pricey, bulky and complex in design. Accordingly, there remains a need for low-cost improvements to such air management systems.

SUMMARY OF THE INVENTION

According to an aspect of the disclosure, an air management system is provided for a vehicle having a body and plurality of wheels. The air management system includes at least one air spring for interconnecting the body and one of the wheels. A compressor is provided for filling the air spring. A central air line is disposed between the air spring and the compressor and fluidly connected to the air spring and the compressor. At least one spring air line extends between the central air line and the air spring. At least one suspension valve is disposed along the spring air line for selectively allowing and preventing air from flowing between the air spring and the central air line. At least one auxiliary air line extends between the spring air line and the central air line. At least one high flow exhaust valve is disposed along the auxiliary air line for selectively allowing and preventing air from passing between the spring air line and the central air line. At least one isolation check valve is disposed in series with the high flow exhaust valve along the spring air line. The isolation check valve allows air to pass therethrough from the air spring to the central air line while preventing air from passing therethrough from the central air line to the air spring.

According to another aspect of the disclosure, a method for operating an air management system for a vehicle having a body and plurality of wheels is provided. The method includes providing at least one air spring for interconnecting the body and one of the wheels, a compressor for filling the air spring, a central air line disposed between the air spring and the compressor and fluidly connected to the air spring and the compressor, at least one spring air line extending between the central air line and the air spring, and at least one suspension valve disposed along the spring air line and moveable between an open position and a closed position. The suspension valve allows air to pass between the air spring and the central air line while the suspension valve is in the open position, and the suspension valve inhibits air from passing between the air spring and the central line while the suspension valve is in the closed position. The method further includes providing at least one auxiliary air line extending between the spring air line and the central air line, and at least one high flow exhaust valve disposed along the auxiliary air line being moveable between an open position and a closed position. The high flow exhaust valve allows air to pass between the spring air line and the central air line when the high flow exhaust valve is positioned in the open position, and the high flow exhaust valve inhibits air from passing between the spring air line and the central air line when the high flow exhaust valve is positioned in the closed position. The method also includes providing at least one isolation check valve disposed in series with the high flow exhaust valve along the spring air line. The isolation check valve allows air to pass through the isolation check valve from the air spring to the central air line and, prevents air from passing through the isolation check valve from the central air line to the air spring. The method also includes positioning the suspension valve and the high flow exhaust valve in their open positions to allow air to pass from the air spring through the suspension valve and the high flow exhaust valve to the central air line at a faster rate than it would pass through the suspension valve alone.

Because of the presence of the suspension valve, high flow exhaust valve and isolation check valve, an advantage of the subject management system is that two exhaust rates may be provided: 1) a slower option of allowing air to flow out of only the suspension valve, and 2) a faster option allowing air to flow out of the suspension valve, the high flow exhaust valve and isolation check valve. Furthermore, the orifice size of the suspension valve, high flow fast exhaust valve and/or isolation check valve may be changed to influence air flow, thereby advantageously allowing intake vs. exhaust rates to be tuned.

The subject air management system is also advantageously simple in design, compact and inexpensive to manufacture.

BRIEF DESCRIPTION OF THE DRAWINGS

Advantages of the present invention will be readily appreciated, as the same becomes better understood by reference to the following detailed description when considered in connection with the accompanying drawings wherein.

DESCRIPTION OF THE EXAMPLE EMBODIMENTS

Referring to the figures, an air management system 20, 120, 220 is generally shown for controlling an air suspension assembly of a vehicle having a body and wheels. In the example embodiment, the subject air management system 20, 120, 220 is described for use on an automobile having four wheels, however, it should be appreciated that it could be utilized on other vehicles having any number of wheels including, but not limited to, motorcycles and all-terrain vehicles.

Figure 1:
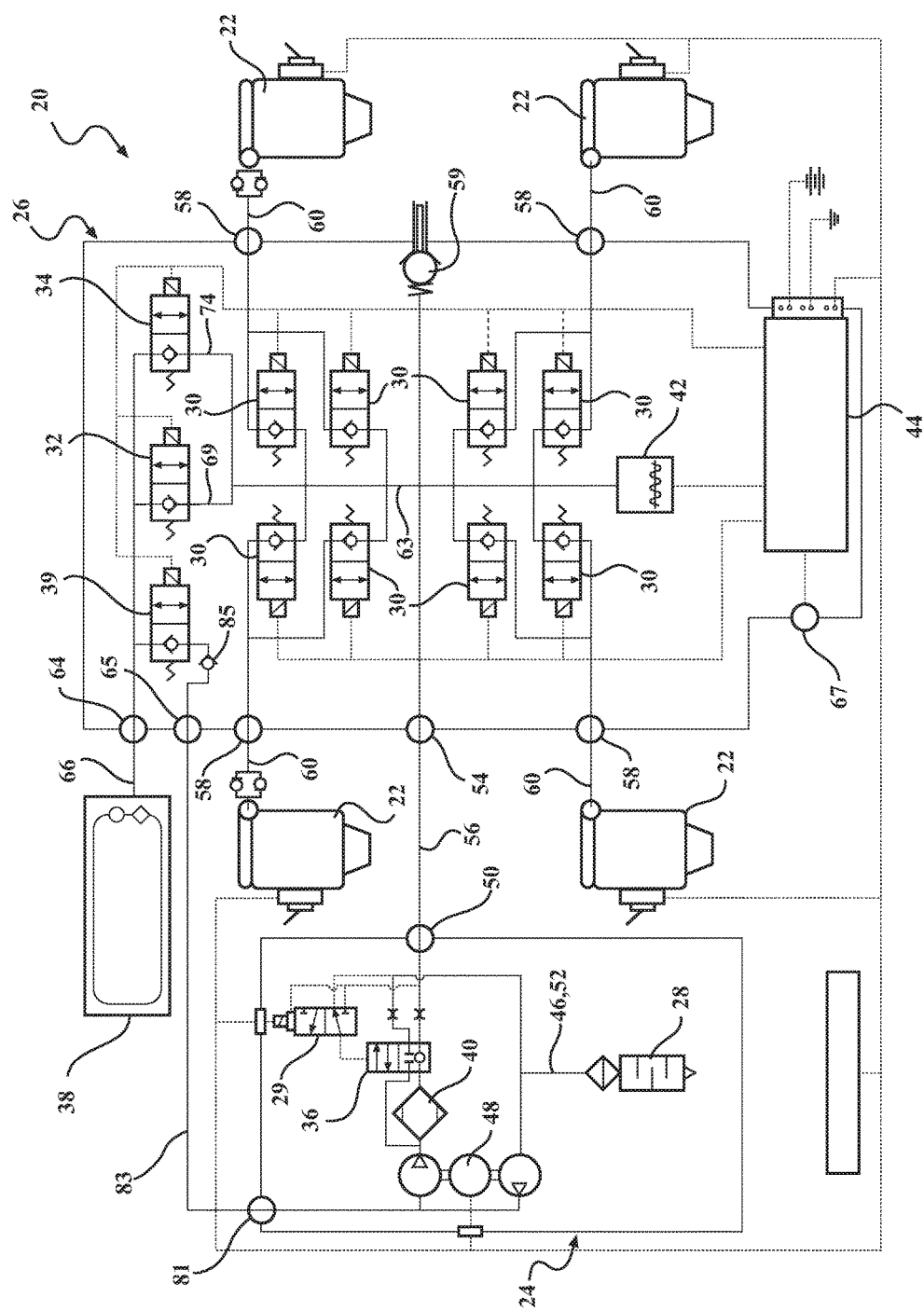
FIG. 1 is a schematic diagram of a first example embodiment of an air management system having a pair of parallel suspension valves for each air spring.
Figure 2:
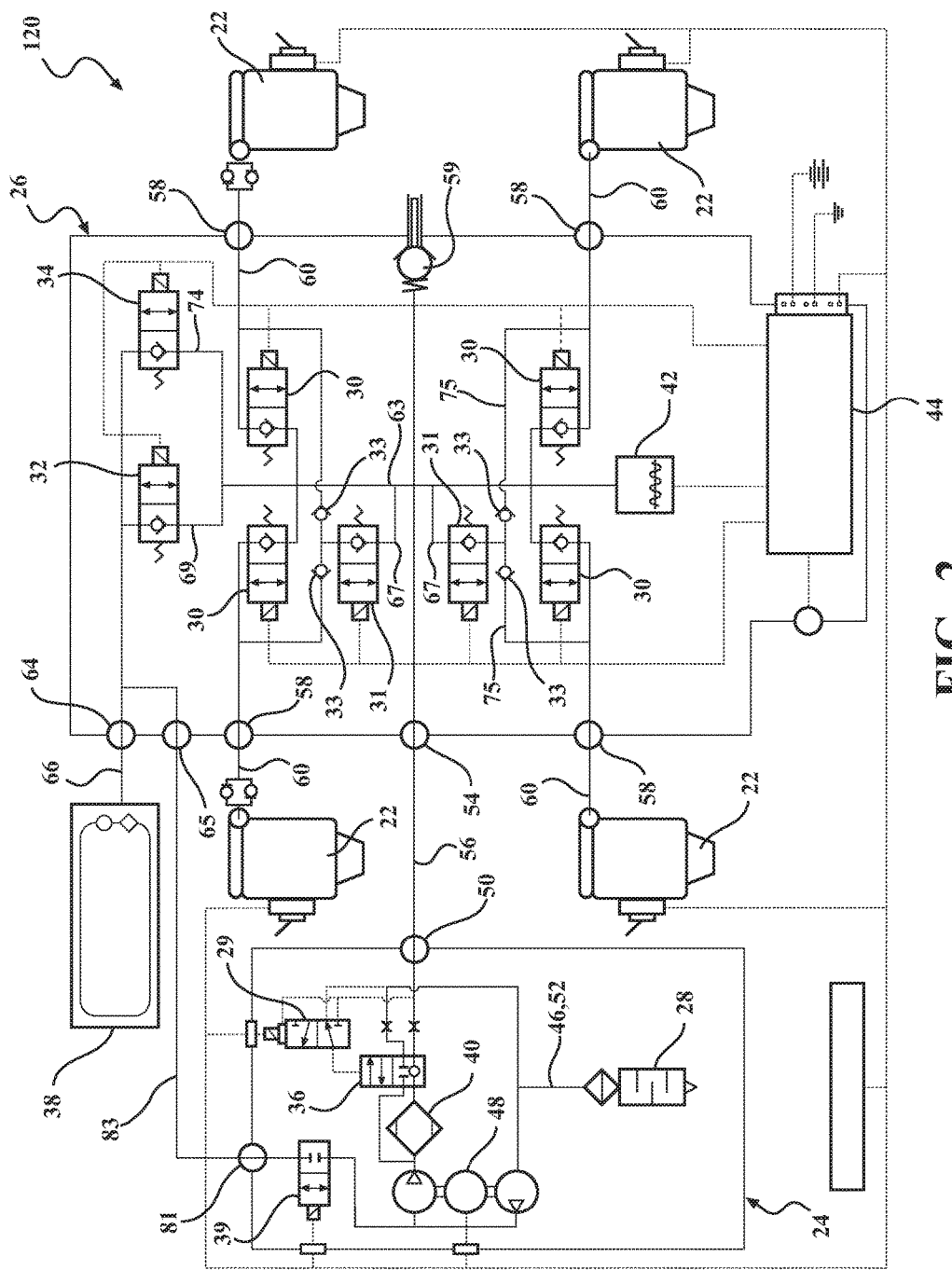
FIG. 2 is a schematic diagram of a second example embodiment of an air management system having a high flow fast exhaust valves and pair of check valves connected to each air spring.
Figure 11:
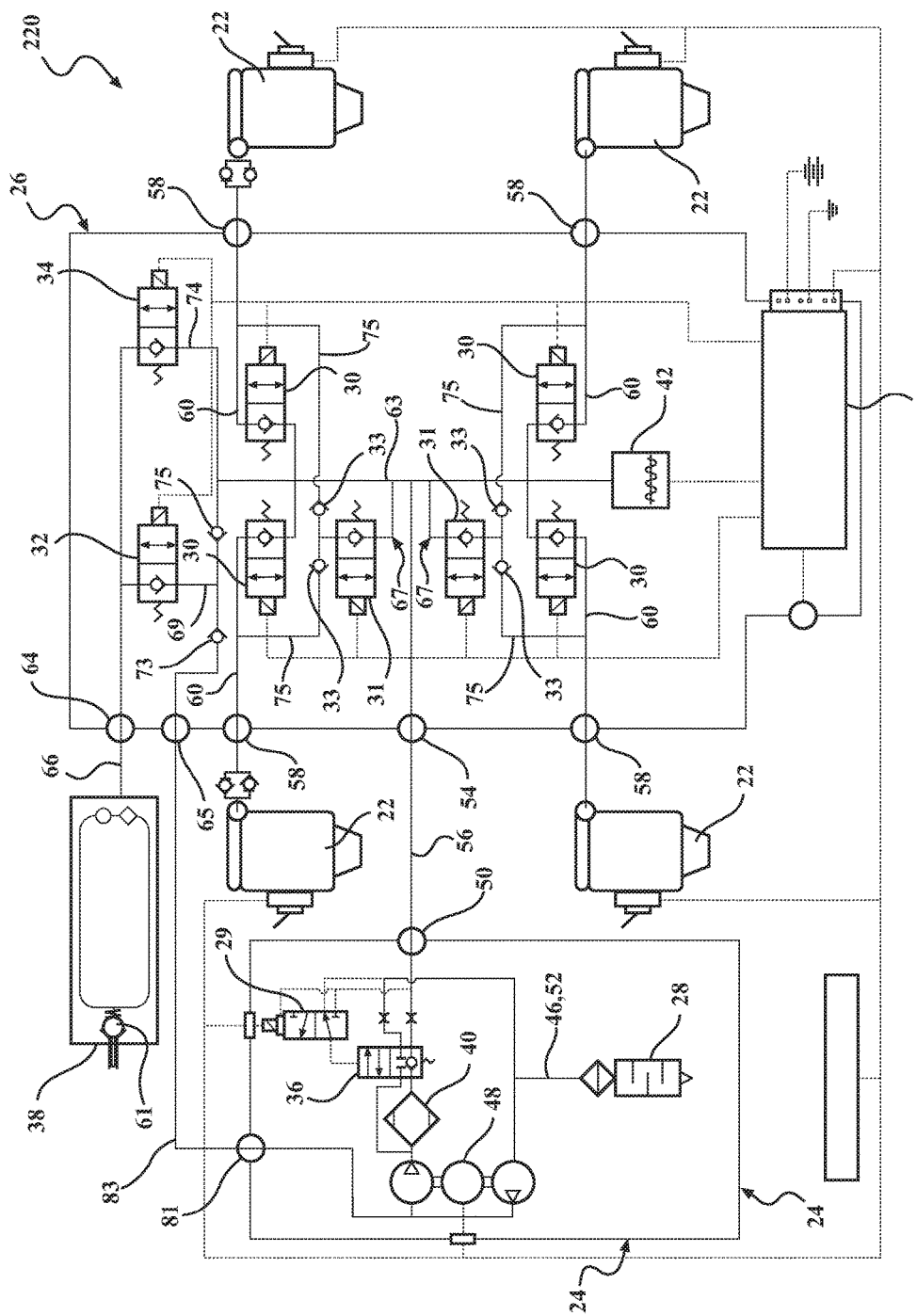
FIG. 11 is a schematic diagram of a third example embodiment of an air management system having a pair of boost check valves for transferring air from a first reservoir valve to the compressor.

As best presented in FIGS. 1, 2 and 11 the air management system 20, 120, 220 is connected to four air springs 22. Each of the air springs 22 interconnect the body and one of the wheels of the vehicle for damping relative forces between the body and the wheels of the vehicle, and for raising and lowering the vehicle to a desired height.

Generally, the air management system 20 includes a compressor 24 for providing pressurized air for filling the air springs 22, a manifold block 26 having a plurality of valves 28, 30, 31, 32, 33, 34, 39, 73, 75 for controlling how the air springs 22 are filled and emptied, a reservoir tank 38 for containing a pressurized volume of air, a dryer 40 for reducing the moisture content of the air in the air management system 20, a pressure sensor 42 for determining the pressure in the air springs 22, and an electronic control unit 44 for controlling the air management system 20 to fill or empty the air springs 22. The height varying capabilities of the air management system 20 can be used to perform such functions as maintaining the vehicle ride height due to load variation, lowering the vehicle at speed to provide for improved fuel economy, lowering the vehicle to provide for ease in entering and exiting the vehicle, and for adjusting the height of respective sides of the vehicle for compensating for side-to-side load variations of the vehicle.

The compressor 24 defines an air inlet 46 for receiving air into the compressor 24, as well as a motor 48 for drawing air through the air inlet 46. The compressor 24 also defines a primary outlet 50 for fluidly connecting the compressor 24 with, and providing air to the reservoir tank 38 and manifold block 26. Furthermore, the compressor 24 defines a first exhaust outlet 52 for relieving air from the air management system 20. An air intake/exhaust valve 28 is disposed in the first exhaust outlet 52 and is electrically connected to the electronic control unit 44 for selectively opening and closing the first exhaust valve 28 for inhibiting and allowing air to pass through the air inlet 46 and the exhaust outlet 52. A second exhaust valve 29 is also provided in the compressor 24. It should be appreciated that additional exhaust valves may be provided at other locations of the subject system 20.

The manifold block 26 fluidly connects the air springs 22, compressor 24, dryer 40, and reservoir tank 38. The manifold block 26 defines a compressor inlet port 54. As illustrated in FIGS. 6-10, the inlet port 54 may include a cap 55 for protecting it while not in use. With reference back to FIGS. 1, 2 and 11, a base air line 56 extends between the compressor primary outlet 50 and the compressor inlet port 54 of the manifold block 26 for conveying air between the manifold block 26 and the compressor 24. Furthermore, a central air line 63 is disposed inside the manifold block 26 and is connected to the inlet port 54 such that it is fluidly connected to the base air line 56.

The manifold block 26 further defines four suspension ports 58 that are each fluidly connected to the central air line 63. A plurality of spring air lines 60 each extend between the central air line 63 and one of the air springs 22. Each of the spring air lines 60 includes a first portion that is disposed inside the manifold block 26 and extends from the central air line 63 to the suspension port 58, and a second portion that is disposed outside of the manifold block 26 and extends from the suspension port 58 to one of the air springs 22. The manifold block 26 further includes a plurality of suspension valves 30, each along one of the spring air lines 60 for inhibiting and allowing air to be conveyed between the manifold block 26 and the respective air springs 22. The suspension valves 30 are each electrically connected with the electronic control unit 44 for being selectively moved between an open position and a closed position. More specifically, each suspension valve 30 allows the passage of air between the air spring 22 and the central air line 63 while in the open position, and each suspension valve 30 inhibits the passage of air between the air spring 22 and the central air line 63 while the suspension valve 30 is in the closed position.

The reservoir tank 38 stores compressed air from the compressor 24 for being distributed to the air springs 22. Because of the stored energy of the compressed air in the reservoir tank 38, the air management system 20 is able to adjust the height of each wheel independently and can elevate the vehicle much quicker due than it would be able to without the reservoir tank 38. The manifold block 26 defines a reservoir port 64 that is fluidly connected to central air line 63. A reservoir air line 66 extends from the reservoir tank 38 to the central air line 63 for conveying air between the manifold block 26 and the reservoir tank 38. The reservoir air line 66 includes an inner segment inside the manifold block 26 between the central air line 63 and the reservoir port 64, and an outer segment disposed outside of the manifold block 26 between the reservoir port 64 and the reservoir tank 38.

The manifold block 26 further includes a first reservoir valve 32 and a second reservoir valve 34 that are each disposed in-line with the reservoir port 64 along the reservoir air line 66 inside the manifold block 26 for selectively inhibiting and allowing air to be conveyed between the manifold block 26 and reservoir. The first and second reservoir valves 32, 34 are each electrically connected with the electronic control unit 44 for selectively opening and closing the reservoir valves 32, 34.

The first and second reservoir valves 32, 34 are positioned in parallel relationship to one another, allowing one or both of the first and second valves 32, 34 to be closed at any given time. More specifically, the reservoir air line 66 splits into a first branch 69 and a second branch 74, and join back together along a portion of the reservoir air line 66. The first reservoir valve 32 is disposed along the first branch 69, and the second reservoir valve 34 is disposed along the second branch 74.

Each of the reservoir valves 32, 34 includes an orifice therein through which air passes. The size of the orifice of the first reservoir valve 32 is smaller than the orifice of the second reservoir valve 34. The size of the orifices of the reservoir valves 32, 34 may vary to provide different flow rates between the reservoir 38 and manifold block 26. Because of the presence of the pair of reservoir valves 32, 34, three distinct flow rates of air being conveyed through the reservoir valves 32, 34 are possible: 1) maximum flow—when the first and second reservoir valves 32, 34 are open, 2) first reservoir valve half flow—when the first reservoir valve 32 is opened and the other is closed, and 3) second reservoir valve half flow—when the second reservoir valve 34 is opened and the other is closed. It should be appreciated that under certain operating conditions, it can be desirable to utilize different flow rates of air into the air springs 22 to fill the air springs 22 at faster or slower rates.

Contrary to the subject invention, conventional prior art air management systems typically only include only a single reservoir valve. The valve of such prior art air management systems is typically of the poppet type and has an elastomeric element present at the sealing area to prevent leakage. Such prior art poppet valves are not air linear type valves, and are therefore only either fully open for maximum flow, or fully closed for zero flow.

A boost air line 83 extends between the reservoir air line 66 and a secondary inlet 81 of the compressor 24. As illustrated in FIG. 1, a boost valve 39 may be disposed along the boost air line 83 in the compressor 24 for selectively directly connecting the reservoir 38 and compressor 24. A boost port 65 may be disposed defined by the manifold block 26 for connecting the boost air line 83 to the manifold 26. The boost valve 39 may be electrically connected to the electronic control unit 44 for selectively opening and closing the boost valve 39. It should be appreciated that the boost valve 39 may be utilized to provide a reduction in startup torque of the compressor 24 without exhausting the manifold block 26.

As illustrated in the embodiment shown in FIG. 11, a first boost check valve 73 may be disposed along the boost air line 83 for allowing air to pass from the reservoir tank 38 to the compressor 24, while preventing air from passing from the compressor 24 to the reservoir tank 38. Furthermore, a second boost check valve 75 may be disposed along the reservoir valve air line 66 between the first reservoir valve 32 and the central air line 63 for allowing air to pass through the second boost check valve 75 from the reservoir 38 to the central air line 63 while preventing air from passing through the second boost check valve 75 from the central air line 63 to the first reservoir valve 32. It should be appreciated that the integration of the first and second boost check valves 73, 75 allow the first reservoir valve 32 with the smaller orifice to act as a boosting valve. This allows the elimination of a separate boosting valve in the compressor 24, thus saving the cost of the expenses associated with the boosting valve and corresponding wiring. Additionally, the first and second boost check valves 73, 75 may easily be fitted into the manifold block 26 due to their simple and compact configuration.

As illustrated in FIGS. 1, 2 and 11, the dryer 40 is disposed in-line with the compressor 24 inlet port 54 outside of the manifold block 26. The dryer 40 reduces moisture in the air being conveyed through the base air line 56 to the manifold block 26 before it enters the reservoir tank 38 and air springs 22. Moisture is a common issue for such pressurized systems, as water vapor in the atmosphere can condense inside the unit and create concerns for corrosion as well as freezing of components in cold weather conditions. The dryer 40 includes a desiccant disposed therein for absorbing excess moisture in the system that is conveyed through the base air line 56. The moisture content of the desiccant is increased as air passes through the base dryer 40 away from the compressor 24, and the moisture content of the desiccant is decreased as air passes through the dryer 40 toward the compressor 24.

The pressure sensor 42 is disposed in the manifold block 26 for measuring the pressure in the compressor 24, reservoir tank 38 and/or air springs 22. In order to obtain individual readings of each of the air springs 22 or the reservoir, the manifold block 26 is evacuated and then the suspension valve(s) 30, 32, 34 for the device in question are momentarily opened such that the pressure that corresponds with the device in question may be measured. As such, it should be appreciated that the pressure sensor 42 may be utilized to verify that the compressor 24, reservoir tank 38 and suspension valves 30, 32, 34 are operating properly.

A dryer control valve 36 is provided in-line with the compressor inlet port 54. The dryer control valve 36 is electrically connected to the central electronic control unit 44 for selectively opening and closing the dryer control valve 36. In most circumstances, the dryer control valve 36 is left open to permit air flow back and forth to and from the manifold block 26. However, when an individual pressure reading is required of either the reservoir tank 38 or of any combination of the air springs 22, the dryer control valve 36 is closed along with the other air springs 22 and reservoir tank 38, thus isolating the dryer volume from the manifold block 26. Since the manifold block 26 consists largely of small drilled holes connecting the components together, with the dryer control valve 36 closed, there is very little air volume exposed to the pressure sensor 42 as opposed to the volume of the manifold block 26, dryer 40 and base air line 56. This allows the pressure reading of a specific device to stabilize almost instantaneously and with very little air volume loss, thus making them much faster and more efficient. Accordingly, implementing the dryer control valve 36 improves the speed and efficiency of taking pressure readings.

Typical air management systems require a relatively high exhaust flow due to the evaporative effect required from the air dryer 40. Furthermore, in order to lower the vehicle equally from front to rear, it is necessary to exhaust a single axle at any one given time. In order to provide a high exhaust flow, it has been recognized that high volume, low cost poppet solenoid valves may be utilized for the suspension valves 30. However, these suspension valves 30 have a physical size limitation that limits air flow. Also, as system pressures increase, this becomes even more restrictive since the pressure differential experienced on the valve poppet requires that a smaller orifice seat be implemented to reduce the subsequent force imbalance imposed by the higher pressures. Developing larger valves and coils is an option, however, the investment in engineering resources and equipment and tooling costs can be very prohibitive for a relatively low volume application as opposed to using a few extra low cost valves already being produced in high volume serial production.

As best illustrated in FIG. 1, one method to implement a high exhaust flow is to implement a pair of poppet-style suspension valves 30 in a parallel circuit for each air spring 22. The use of parallel suspension valves 30 has the advantage that they do not have to be of equal orifice size. In particular, suspension valves 30 with smaller orifice sizes are capable of opening at higher pressures as noted above, but of course with less flow. When suspension valves 30 are in parallel and one suspension valve 30 has a smaller orifice than the other, the smaller orifice valve may be actuated first to achieve a pressure balance across both suspension valves 30 which subsequently allows the larger valve 30 to also be opened just under spring load.

As further illustrated in FIG. 1, for a four wheel air suspension system 20, implanting parallel suspension valves 30 includes the addition of four suspension valves 30—one per each suspension corner of the vehicle. For systems requiring a high flow rate for both raising and lowering of the vehicle, this is a very cost effective solution. But in many cases, the vehicle specifications only dictate higher flow rates for lowering of the vehicle. So implementing parallel suspension valves 30 for all four corners which allow faster flow in both directions is more than required by the specifications and also adds to the size and mass of the pneumatic block 26.

Figure 3:
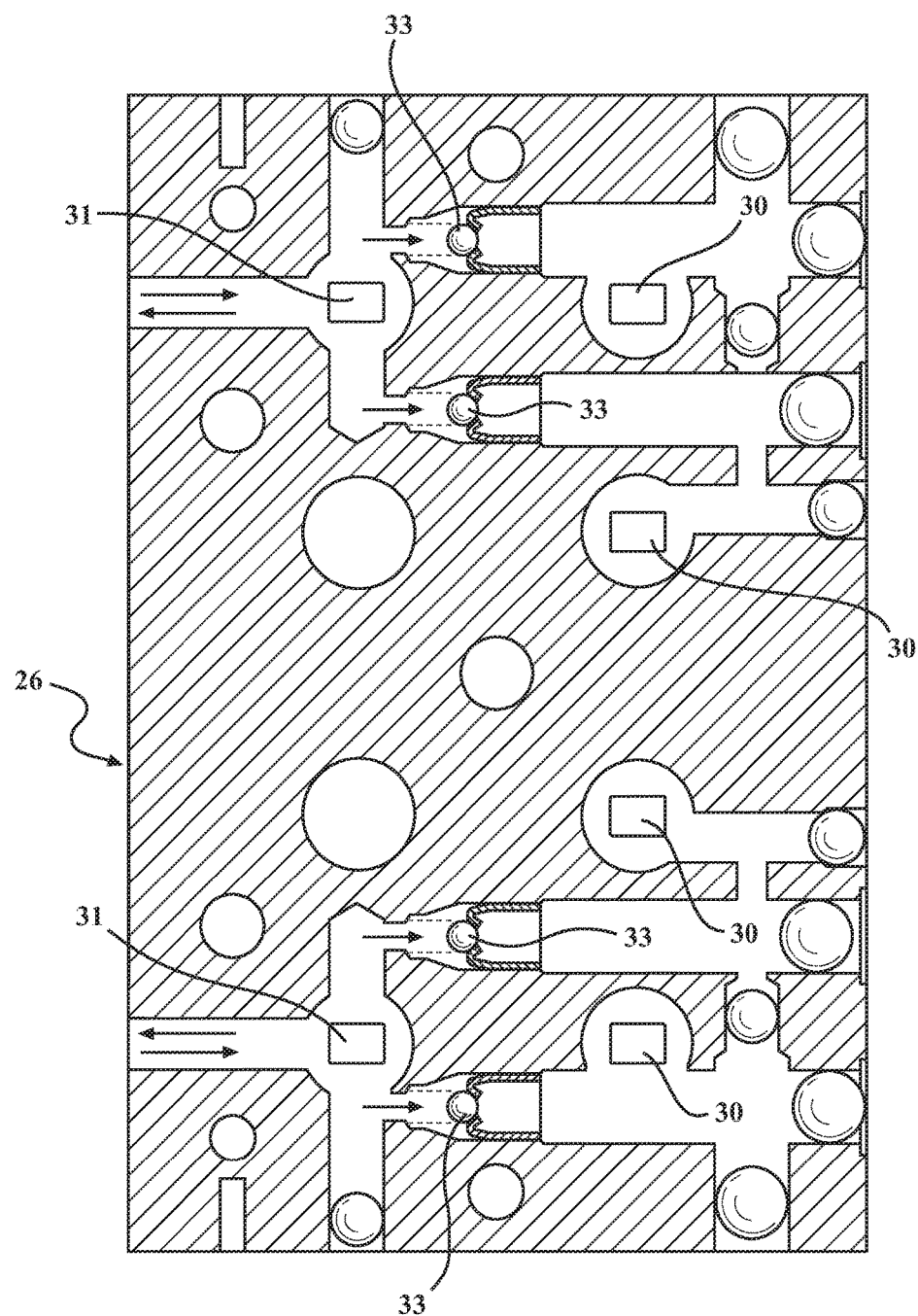
FIG. 3 is a side view of high flow fast exhaust valves and corresponding check valves, demonstrating the valves operating during a pressure-in scenario.
Figure 4:
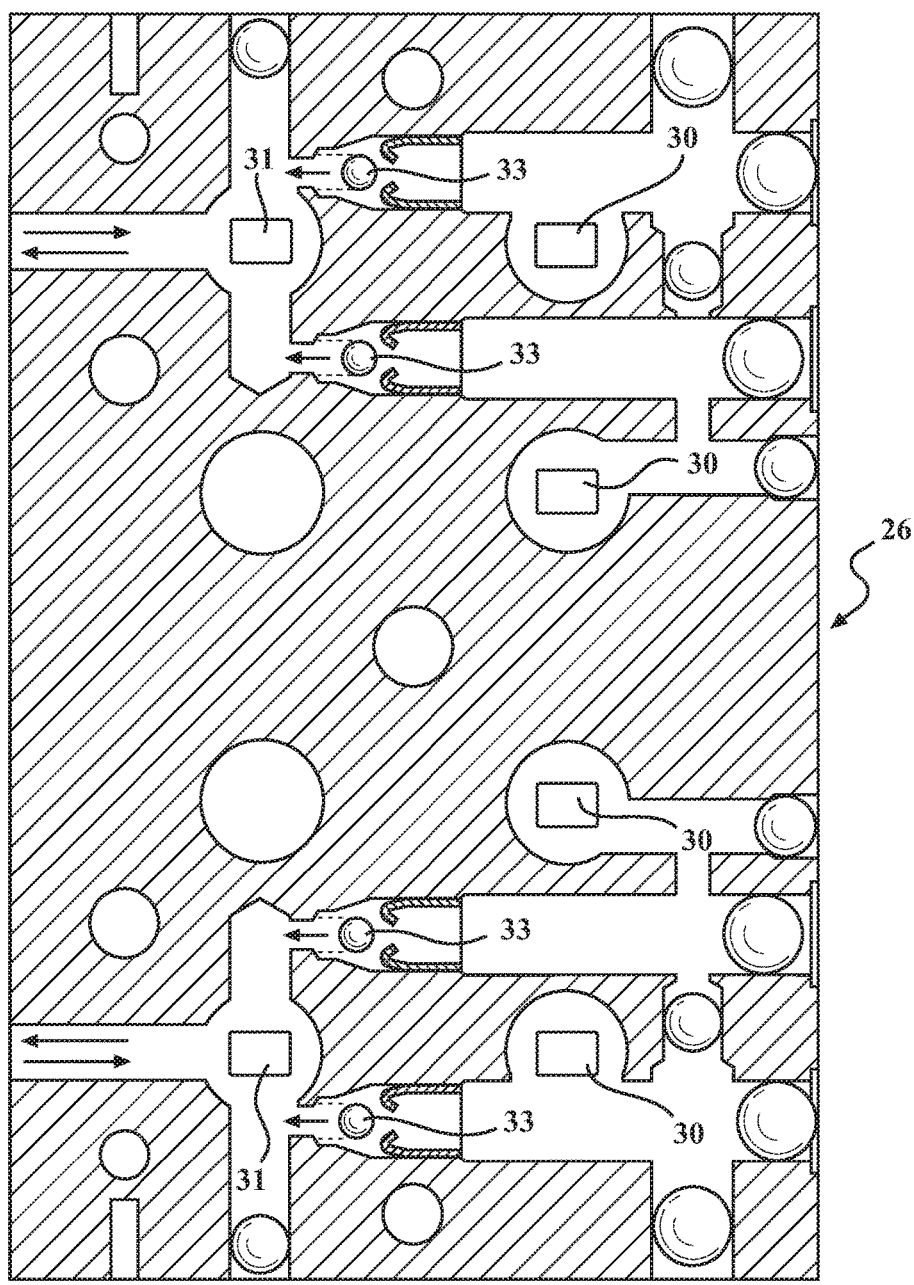
FIG. 4 is a side view of high flow fast exhaust valves and corresponding check valves, demonstrating the valves operating during an exhaust-out scenario.
Figure 5:
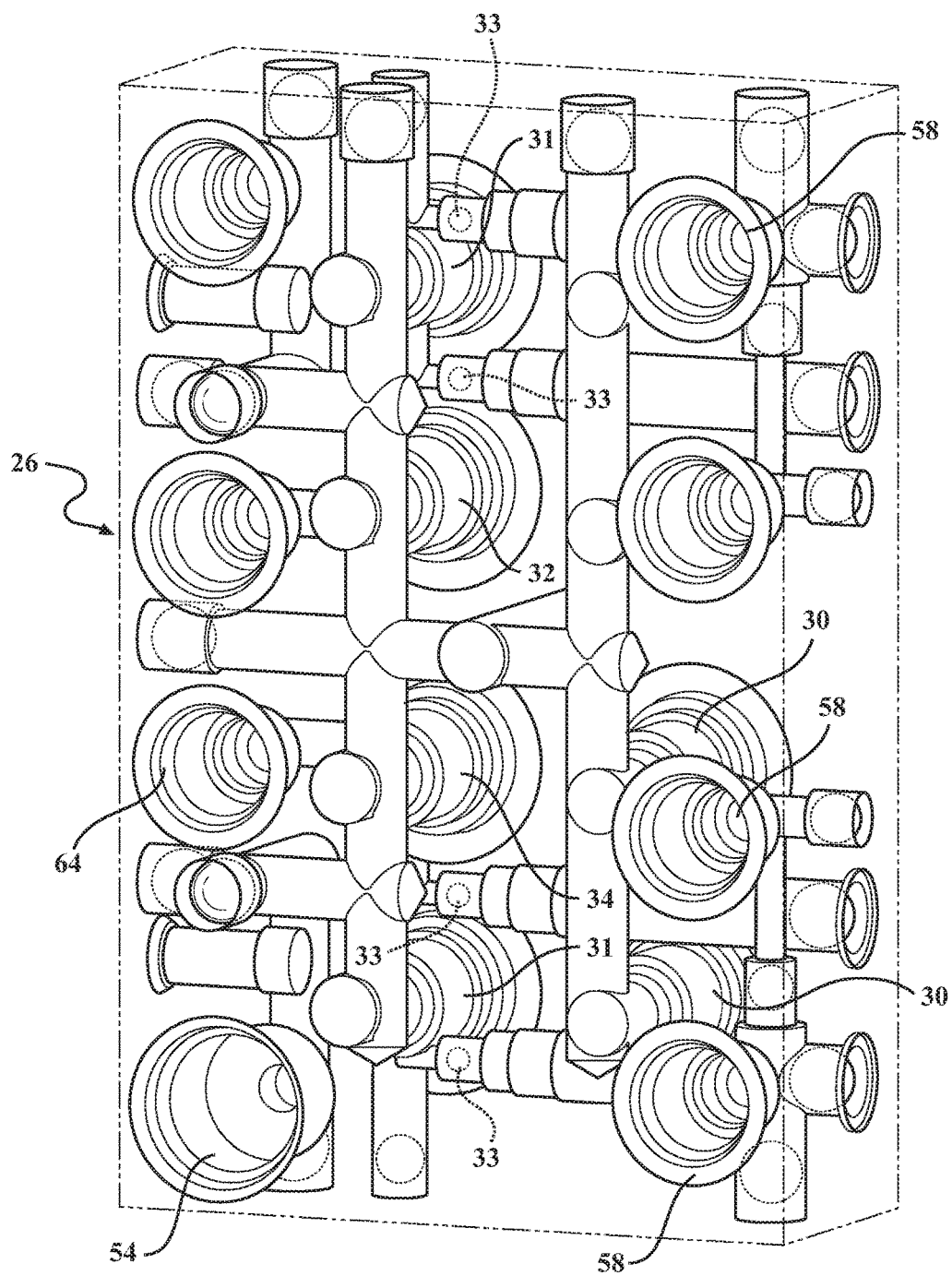
FIG. 5 is a partial perspective view of a manifold block having the high flow fast exhaust valves and check valves incorporated therein.
Figure 5A:
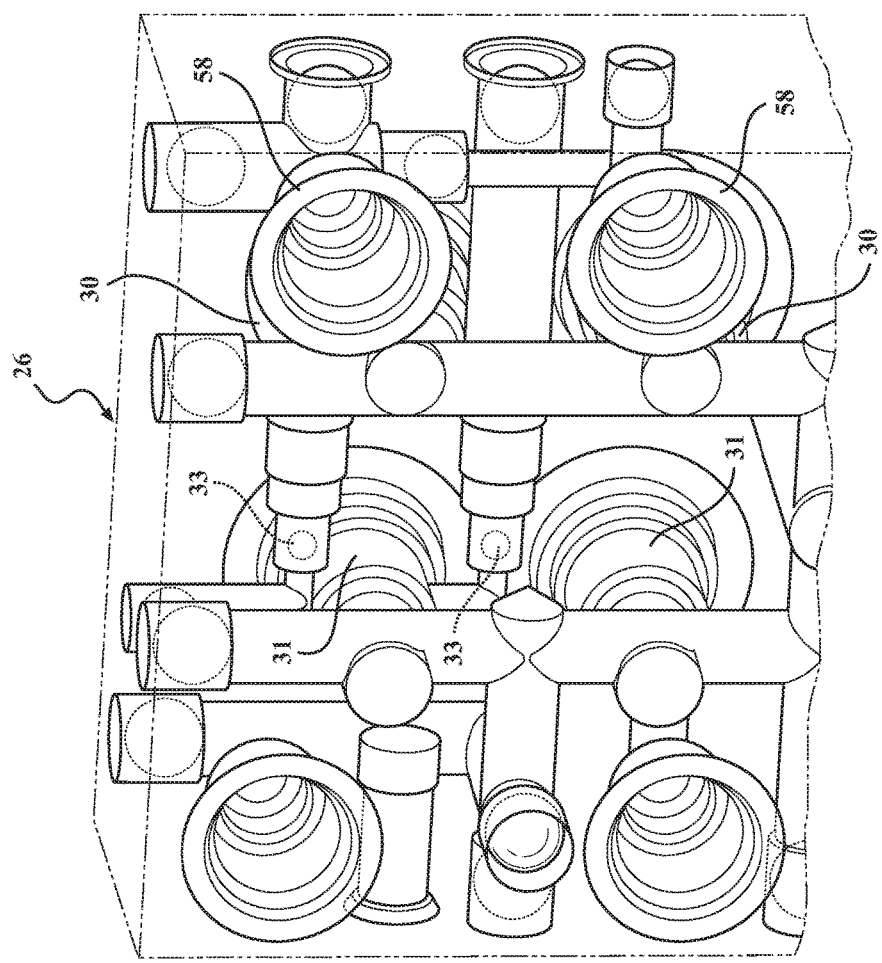
FIG. 5A is a magnified view of the high flow fast exhaust valves and check valves of FIG. 5.
Figure 6:
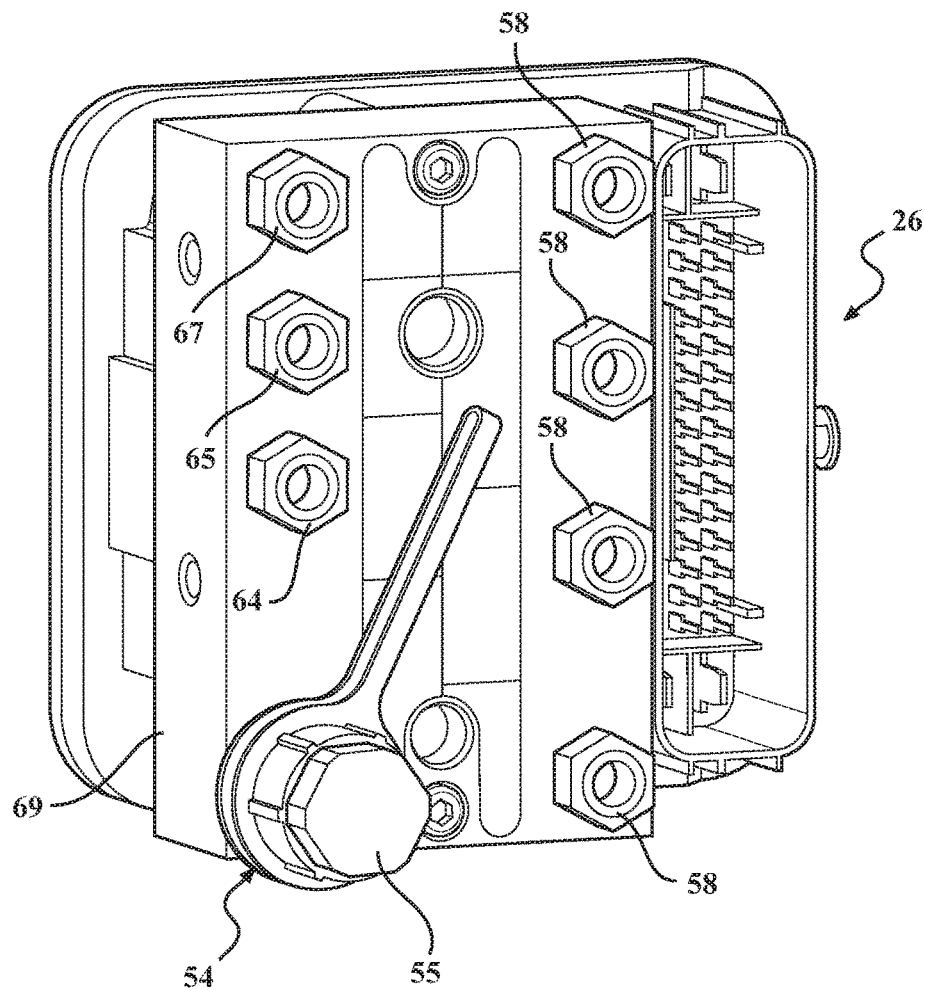
FIG. 6 is a perspective view of an integrated electronic controller and pneumatic block according to an aspect of the disclosure.

An alternative solution is presented in FIGS. 2-6 and 9-11. In this embodiment, a single, large orifice high flow exhaust valve 31 may be implemented in the control circuit for each air spring 22 by the addition of two isolation check valves 33. As best illustrated in FIGS. 3-4, these isolation check valves 33 are configured in such a manner so as to allow flow though the high flow exhaust valve 31 when the vehicle is lowering but prevent flow to the forward direction when the air springs 22 are filling. In other words, the high flow exhaust valve 31 and isolation check valves 33 provide an additional flow path to improve trans-axle exhaust flow. More specifically, an auxiliary air line 67, 75 is provided that extends between the spring air line 60 and the central air line 63 and is connected to the spring air line 60 at a point that is spaced from the suspension valve 30 toward the air spring 22. The high flow exhaust valve 31 is disposed along the auxiliary air line 67, 75. Furthermore, the isolation check valves 33 are disposed in series with the high flow exhaust valve 31 along the spring air line 60. In the example embodiment, the auxiliary air line 67, 75 includes a base portion 67 that is connected to the central air line 63 and a pair of wing portions 75 that each extend from the base portion 67 to one of the spring air lines 60. Furthermore, the high flow exhaust valve 31 is disposed along the base portion 67, and the pair of isolation check valves 33 are each disposed along one of the wing portions 75.

The high flow exhaust valves 31 are moveable between an open position and a closed position. More specifically, each of the high flow exhaust valve 31 allows air to pass between the spring air line 60 and the central air line 63 when the high flow exhaust valve 31 is positioned in the open position, and the high flow exhaust valve 31 inhibits air from passing between the spring air line 60 and the central air line 63 when the high flow exhaust valve 31 is positioned in the closed position.

Because of the presence of both the suspension valve 30 and high flow exhaust valve 31/isolation check valves 33, this configuration provides for two exhaust rates—1) allowing air to flow out of only the suspension valves 30, and 2) allowing air to flow out of both of the suspension valves 30 as well as the high flow exhaust valves 31/check valves 33. Furthermore, the orifice size of the suspension valve 30, high flow fast exhaust valve 31 and/or isolation check valves 33 may be changed to influence air flow. Accordingly, intake vs. exhaust rates may be tuned.

It should also be appreciated that this configuration provides for fast exhaust while maintaining dryer 40 integrity. As such, this allows an increase in the vehicle lowering rate without harming the dryer 40. Furthermore, this configuration makes the intake and exhaust rates of the open reservoir system function similar to that of a closed system where vehicle raising and lowering rates are about equal. Furthermore, this configuration provides improved exhaust flow while maintaining wheel-to-wheel isolation.

It is advantageous to assign one high flow exhaust valve 31 to each axle (as shown in FIGS. 2-6 and 9-11) since in most instances the side-to-side pressure across an axle tends to be the same or nearly the same. Another reason to implement the high flow exhaust valve 31 across each axle is that in the lowering process it is often required to balance front and rear lowering rates independently. This configuration is thus completely suited to independent axle control. Furthermore, this configuration advantageously allows side to side corner pressure balance due to the axle check valve design and leak rate that results therefrom. A high leak rate will equalize pressure quickly, on the order of seconds to minutes, whereas a low leak rate may take several days. Additionally, the subject configuration allows concurrent lowering of the vehicle on both axles by modulating the fast exhaust valve 31 on the higher pressure axle.

Because of the presence of the high flow exhaust valve 31 and isolation check valves 33, methods for providing multiple inflation and deflation modes to provide air into and out of the air springs 22 are provided. According to a compressor only inflation mode, the boost valve 39 and the reservoir valves 32, 34 are positioned in their closed positions and the dryer control valve 36 is positioned in its open position. In this mode, air is only provided to the manifold block 26 via the compressor 24. According to a compressor with boost inflation mode, the boost valve 39 is positioned in the open position along with the dryer control valve 36, while the reservoir valves 32, 34 are positioned in their closed positions. In this mode, air is able to pass into the secondary inlet 81 of the compressor 24 from the reservoir tank 84 to provide a reduction in startup torque of the compressor 24, while air is also able to pass from the compressor 24 to the manifold block 26. According to a compressor with reservoir inflation mode, either one, or both of the reservoir valves 32, 34 are positioned in the open position along with the dryer control valve 36, thus allowing both the compressor 24 and reservoir tank 38 to provide air to the manifold block 26. According to a reservoir only inflation mode, the manifold block 26 is isolated from the compressor 24 by closing the dryer control valve 36, and one or both of the reservoir valves 32, 34 are positioned in their open positions to allow air to enter the manifold block 26 from only the reservoir tank 38.

According to an isolation valve only deflation mode, the fast exhaust valves 31 are positioned in their closed positions, thereby only allowing air to deflate from the air springs 22 through the suspension valves 30. According to a fast exhaust deflation mode, the fast exhaust valves 31 are positioned in their open positions, along with desired suspension valves 30, thereby allowing air to be exhausted from the air springs 22 faster than it would with only the suspension valves 30 positioned in their open positions.

As best illustrated in FIGS. 5-6 and 9-10, the aforementioned components can be optimally configured in a single pneumatic manifold block 26. Because only a single pneumatic manifold block 26 has to be utilized, additional cost savings and robust manufacturing processes can be implemented. As shown, in the example embodiment of a pneumatic manifold block 26, all ports 58, 64, 65, 67 are defined on a single front face 69, and all valves 30, 31, 32, 33 and sensors 42 on as single, opposing rear face. Furthermore, all holes are oriented orthogonally, which minimizes both machining and assembly costs by reducing the number and complexity of fixtures. Furthermore, having all of the ports 58, 64, 65, 67 on a single face 69 allows users to easily implement pneumatic connections at an assembly facility. Further, having all valves 30, 31, 32, 33 and sensors 42 on a single face allow the implementation of an integrated electronic controller. This is advantageous as convention units use separate valve blocks and stand-alone electronic controllers that are joined by a complex wiring harness. As such, this is another area where significant cost savings and quality improvement are gained by implementation of the subject design into an integrated electronic controller and pneumatic block.

Figure 7:
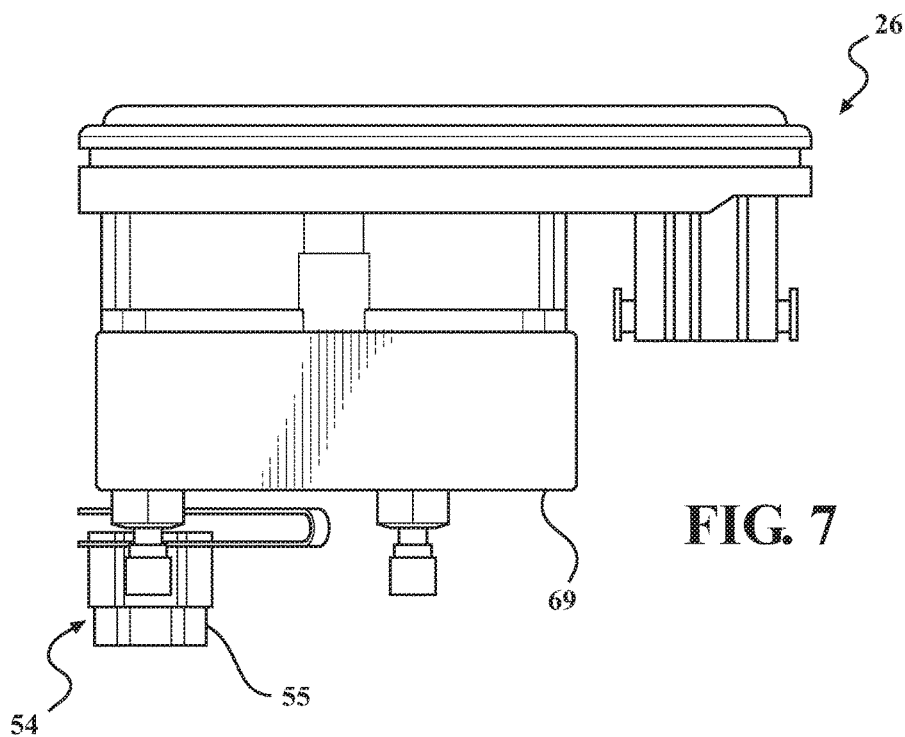
FIG. 7 is a side view of a controller and pneumatic block with parallel suspension valves incorporated therein.
Figure 8:
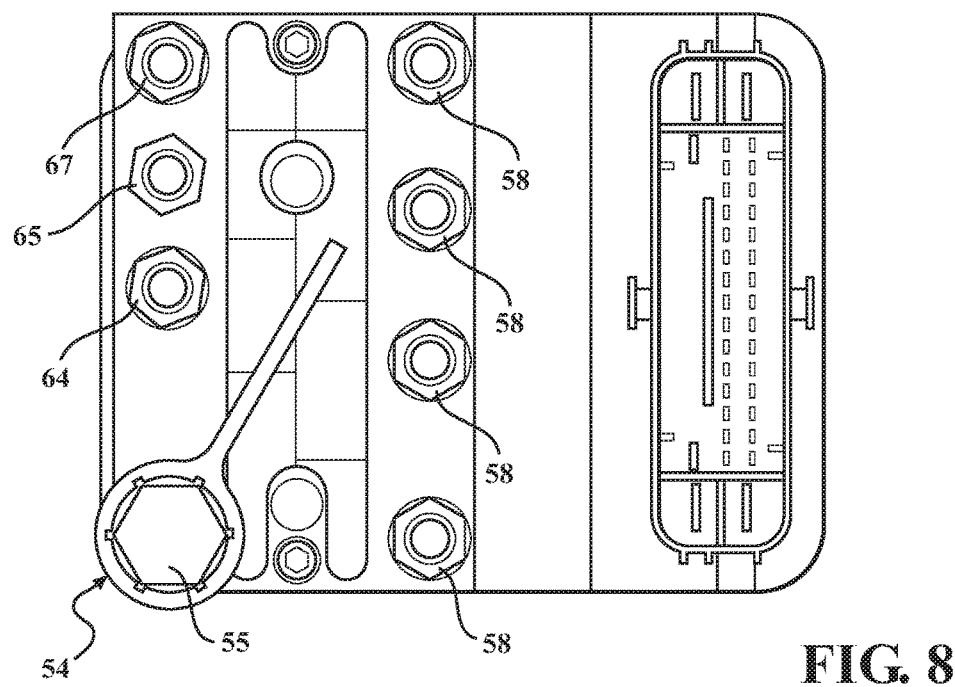
FIG. 8 is a top view of the controller and pneumatic block of FIG. 7.
Figure 9:
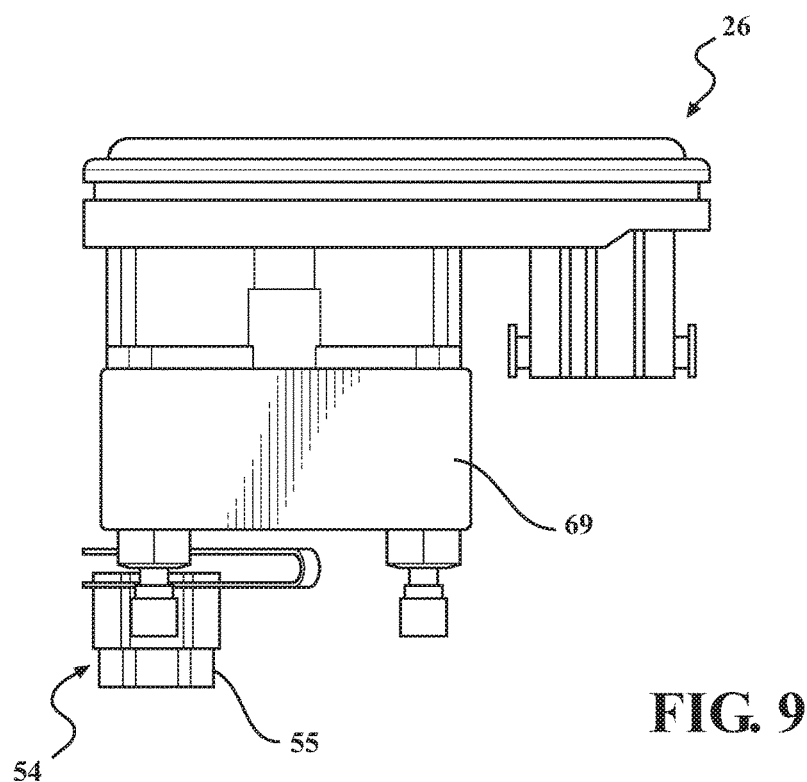
FIG. 9 is a side view of a controller and pneumatic block with high flow fast exhaust valves and check valves incorporated therein.
Figure 10:
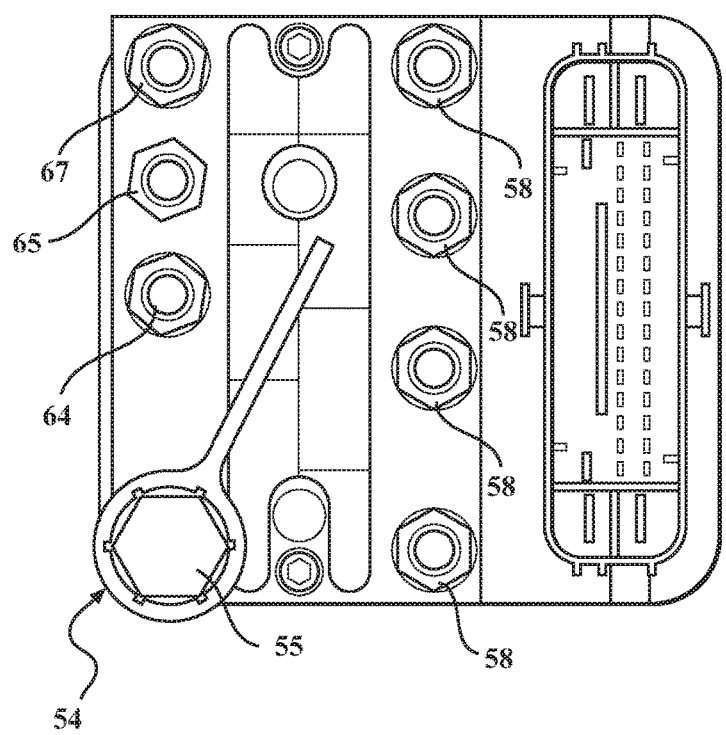
FIG. 10 is a top view of the controller and pneumatic block of FIG. 9.

Additionally, the subject integrated electronic controller and pneumatic block is very small and compact. FIGS. 7-10 illustrate the size savings of utilizing the system that includes the high flow fast exhaust valve 31 and check valves 33 (FIGS. 9-10) vs. the system with parallel suspension valves 30 (FIGS. 7-8). The smaller size is provided in that provided in that the two extra suspension valves 30, extra ECU hardware, and additional packing space for holding the extra suspension valves 30 are eliminated. In addition to size savings, cost savings are also provided because these components do not have to be utilized.

According to the embodiment illustrated in FIGS. 1 and 2, a fill valve 59 may be disposed on the manifold block 26 and fluidly connected to the central air line 63 for drawing ambient air into the manifold block 26 as needed. Alternatively, as illustrated in FIG. 11, the fill valve 61 may be positioned on the reservoir 38 for drawing ambient air into the reservoir 38 as needed.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. An air management system for a vehicle having a body and plurality of wheels, said air management system including:
    at least one air spring for interconnecting the body and one of the wheels;
    a compressor for filling said air spring;
    a central air line disposed between said air spring and said compressor and fluidly connected to said air spring and said compressor;
    at least one spring air line extending between said central air line and said air spring;
    at least one suspension valve disposed along said spring air line for selectively allowing and preventing air from flowing between said air spring and said central air line;
    at least one auxiliary air line extending between said spring air line and said central air line;
    at least one high flow exhaust valve disposed along said auxiliary air line for selectively allowing and preventing air from passing between said spring air line and said central air line; and
    at least one isolation check valve disposed in series with said high flow exhaust valve along said spring air line and allowing air to pass through said isolation check valve from said air spring to said central air line and preventing air from passing through said isolation check valve from said central air line to said air spring.

2. An air management system as set forth in claim 1 wherein said auxiliary air line is connected to said spring air line at a point that is spaced from said suspension valve toward said air spring.

3. An air management system as set forth in claim 1 wherein said at least one air spring includes a pair of air springs; said at least one spring air line includes a pair of spring air lines each extending between said central air line and one of said air springs; said at least one suspension valve includes a pair of suspension valves each disposed along one of said spring air lines; said at least one auxiliary air line includes a base portion connected to said central air line and a pair of wing portions each extending from said base portion to one of said spring air lines; and wherein said high flow exhaust valve is disposed along said base portion.

4. An air management system as set forth in claim 3 wherein said at least one isolation check valve includes a pair of isolation check valves each disposed along one of said wing portions.

5. An air management system as set forth in claim 1 further including a reservoir for storing compressed air from said compressor;
    a reservoir air line extending between said reservoir and said central air line;
    said reservoir air line splitting into a first branch and a second branch and joining back to a single air line along a portion of said reservoir air line;
    a first reservoir valve disposed along said first branch and a second reservoir valve disposed along said second branch such that said first and second reservoir valves are parallel with one another, each of said first and second reservoir valves having an orifice for allowing air to pass therethrough, and each of said reservoir valves selectively allowing air to pass through said reservoir valve between said reservoir and said central air line;
    said orifice of said first reservoir air line being smaller than said orifice of said second reservoir air line for providing variable flow rates of air being conveyed between said reservoir tank and said central air line depending on which reservoir valve is opened and which reservoir valve is closed.

6. An air management system as set forth in claim 5 wherein a boost air line extends between said reservoir air line and said compressor for allowing air from said reservoir to pass to said compressor.

7. An air management system as set forth in claim 6 further including a first boost check valve disposed along said boost air line allowing air to pass from said reservoir to said compressor while preventing air from passing from said compressor to said reservoir.

8. An air management system as set forth in claim 7 further including a second boost check valve disposed along said reservoir air line between said first reservoir valve and said central air line allowing air to pass through said second boost check valve from said reservoir to said central air line while preventing air from passing through said second boost check valve from said central air line to said first reservoir valve.

9. An air management system as set forth in claim 1 further including a manifold block containing said central air line, said suspension valve, said high flow exhaust valve and said at least one isolation check valve.

10. An air management system as set forth in claim 9 wherein said manifold block includes an inlet port fluidly connected to said central air line and at least one suspension port fluidly connected to said spring air line.

11. An air management system as set forth in claim 10 wherein said manifold block includes a front face and a rear face on opposing sides from one another, wherein said inlet port and suspension port are disposed on said front face, and wherein said suspension valve, said high flow exhaust valve and said isolation check valve are disposed on said rear face.

12. An air management system as set forth in claim 11 wherein said suspension valve is disposed in air line with said suspension port in said manifold block.

13. An air management system as set forth in claim 11 further including a pressure sensor disposed in said manifold block and connected to said central air line for reading a pressure of said at least one air spring.

14. An air management system as set forth in claim 13 wherein said manifold block defines a compressor inlet port fluidly connected to said central air line; a base air line fluidly connects said compressor to said compressor inlet port; and wherein a dryer is disposed in-line with said compressor inlet port outside of said manifold block for removing moisture from air being transferred from said compressor to said manifold block.

15. An air management system as set forth in claim 14 further including a dryer control valve disposed in-line with said compressor inlet port outside of said manifold block for allowing the volume of said manifold block to be isolated from said dryer and said compressor.

16. An air management system as set forth in claim 11 further including a controller electrically connected to said suspension valve, said high flow exhaust valve and said isolation valve for allowing said controller to open and close said suspension valve, high-flow exhaust valve and said isolation valve.

17. An air management system as set forth in claim 16 wherein said controller is integrated into said manifold block.

18. A method for operating an air management system for a vehicle having a body and plurality of wheels, said method including:
providing at least one air spring for interconnecting the body and one of the wheels;
providing a compressor for filling the air spring;
providing a central air line disposed between the air spring and the compressor and fluidly connected to the air spring and the compressor;
providing at least one spring air line extending between the central air line and the air spring;
providing at least one suspension valve disposed along the spring air line and moveable between an open position and a closed position, wherein the suspension valve allows air to pass between the air spring and the central air line while the suspension valve is in the open position, and wherein the suspension valve inhibits air from passing between the air spring and the central line while the suspension valve is in the closed position;
providing at least one auxiliary air line extending between the spring air line and the central air line;
providing at least one high flow exhaust valve disposed along the auxiliary air line and moveable between an open position and a closed positioned, wherein the high flow exhaust valve allows air to pass between the spring air line and the central air line when the high flow exhaust valve is positioned in the open position, and wherein the high flow exhaust valve inhibits air from passing between the spring air line and the central air line when the high flow exhaust valve is positioned in the closed position;
providing at least one isolation check valve disposed in series with the high flow exhaust valve along the spring air line and allowing air to pass through the isolation check valve from the air spring to the central air line and preventing air the passing through the isolation check valve from the central air line to the air spring; and
positioning the suspension valve in the open position and the high flow exhaust valve in the open position to allow air to pass from the air spring through the suspension valve and the high flow exhaust valve to the central air line at a faster rate than it would pass through the suspension valve alone.

19. A method as set forth in claim 18 wherein the air management system further includes a manifold block containing the central air line, the suspension valve, the high flow exhaust valve, the at least one isolation check valve, and a pressure sensor connected to the central air line for reading a pressure of the manifold block and air springs.

20. A method as set forth in claim 19 wherein the manifold block further defines a compressor inlet port that is fluidly connected to the central air line; wherein a base air line fluidly connects the compressor to the compressor inlet port; wherein a dryer is disposed in-line with the compressor inlet port outside of the manifold block for removing moisture from air being transferred from the compressor to the manifold block; wherein a dryer control valve is disposed in-line with the compressor inlet port outside of the manifold block and is moveable between an open position and a closed position, wherein the dryer control valve allows air to pass between the compressor and the manifold block in the open position, and wherein the dryer control valve inhibits air from passing between the compressor and the manifold block in the closed position with the dryer fluidly isolated from the manifold block; and wherein the method further includes closing the dryer control valve and obtaining a pressure reading of the central air line with the pressure sensor to obtain a pressure reading of the manifold block while it is isolated from the dryer.

* * * * *